July 1, 1930.  E. LUNN  1,769,148
ELECTRIC WELDING MACHINE
Filed March 1, 1929  2 Sheets-Sheet 1
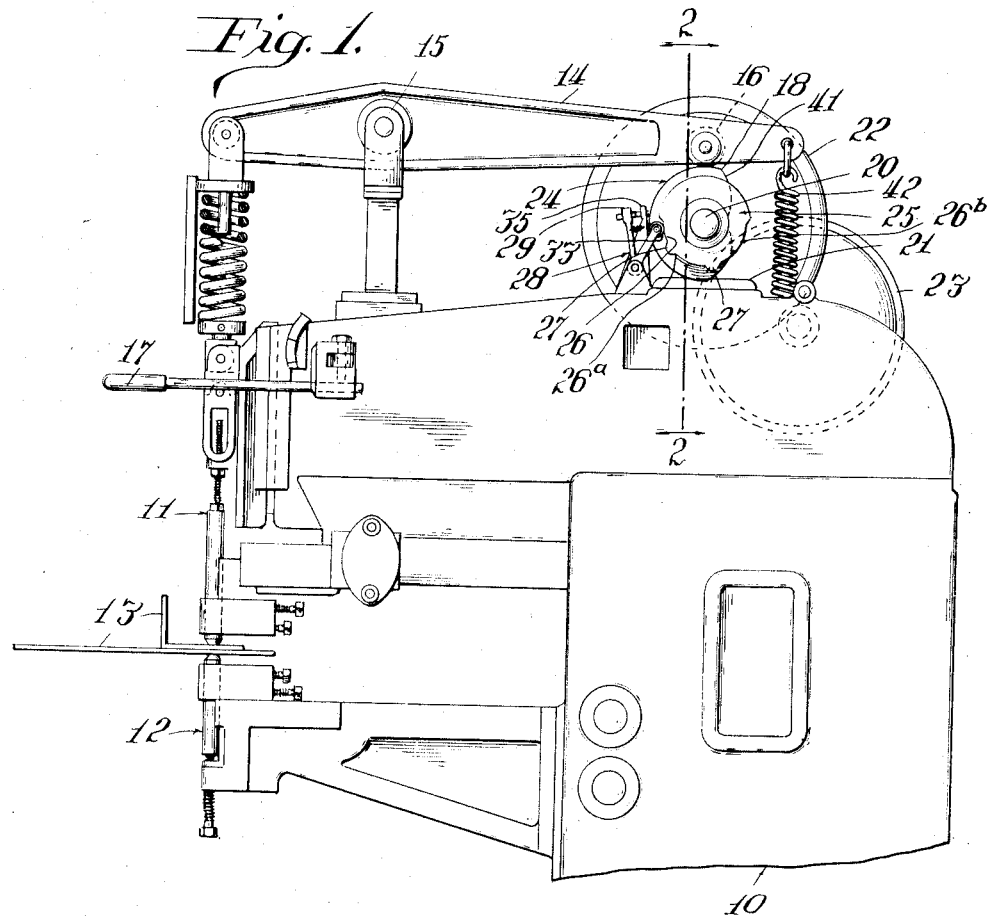
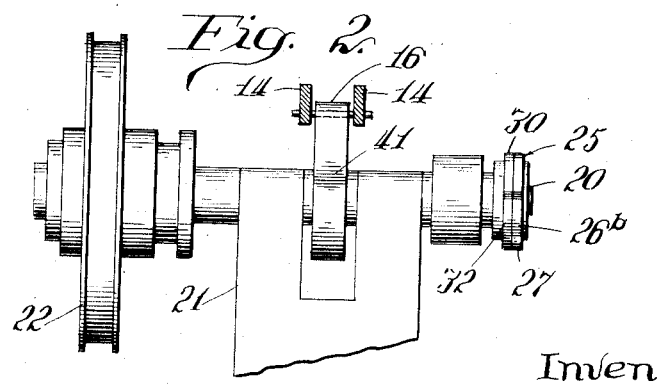
Inventor
Ernest Lunn
By Oscar Hochberg
his Attorney

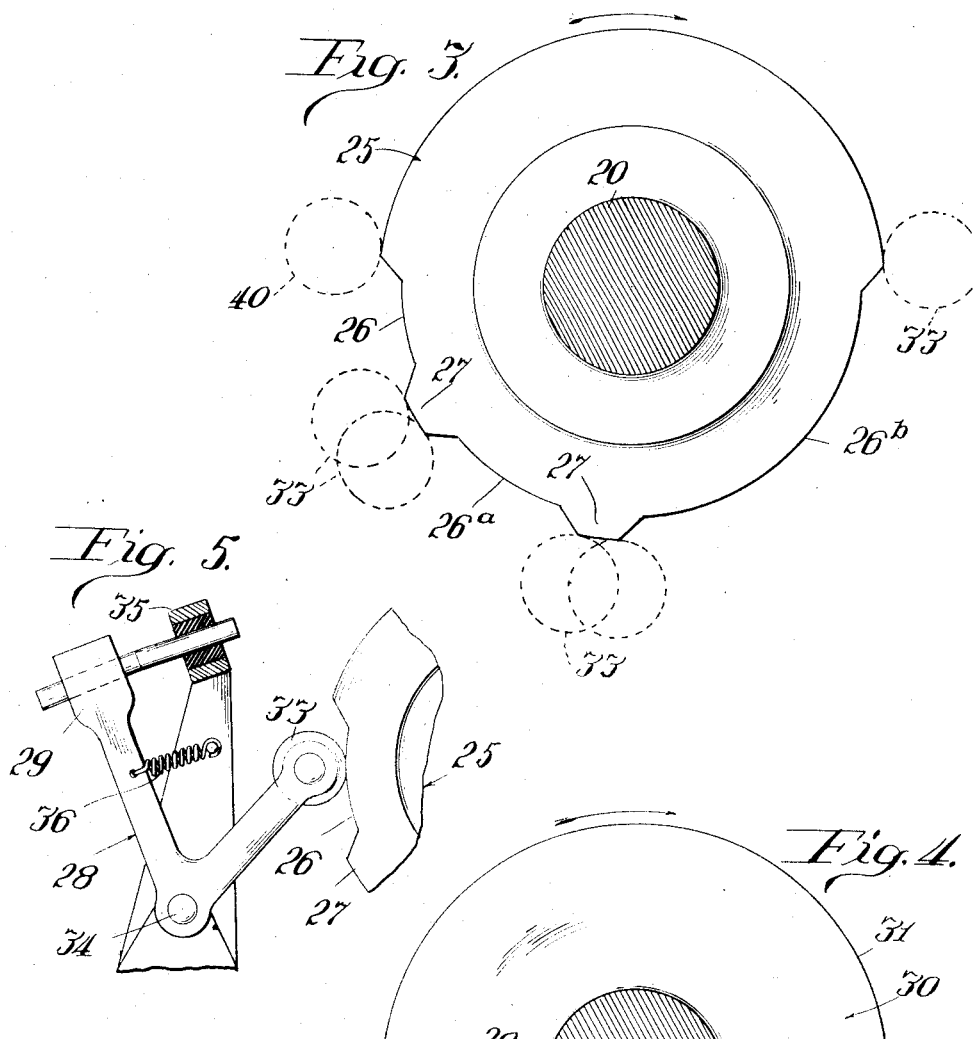

Patented July 1, 1930

1,769,148

UNITED STATES PATENT OFFICE

ERNEST LUNN, OF CHICAGO, ILLINOIS, ASSIGNOR TO PULLMAN CAR AND MANUFACTURING CORPORATION, OF CHICAGO, ILLINOIS, A CORPORATION OF ILLINOIS

ELECTRIC WELDING MACHINE

Application filed March 1, 1929. Serial No. 343,692.

This invention relates to mechanism for performing the process covered in my co-pending application filed February 7, 1927, Serial #166,445.

The invention relates to a power driven machine adapted to intermittently and automatically deliver current to the material to be welded, whereby the scale, rust, and foreign matter between the contacting surfaces of the work will be broken up by the heat of the first application of current, melted and dispersed and the material preheated for fusion by a subsequent application of current, and the weld completed by further heating and fusing upon final application of the current.

An important object of the invention is to permit the utilization in electric welding operations of so-called "black stock" steel materials without first subjecting them to pickling or sandblasting operations to clear the contacting surfaces of matter tending to prevent complete fusion of the parts.

A further object is to provide a power driven welding machine designed to automatically and intermittently apply heating current to the work during periods of electrode pressure only.

The foregoing and other objects are attained by means of the mechanism illustrated in the accompanying drawings, in which Fig. 1 is a side elevation of a spot-welding machine equipped with the invention;

Fig. 2 is a vertical section taken on line 2—2 of Fig. 1 looking in the direction indicated by the arrows;

Fig. 3 is a side elevational view of the current interrupter disk;

Fig. 4 is a similar view showing the interrupter disk control piece; and

Fig. 5 is a like view of the contact switch assembled in closed circuit relation with the current interrupter disk.

Efforts heretofore made to electrically weld "black stock" steel plates have proved unsatisfactory because it was found that a current applied continuously during the welding operation resulted in excessive heating of the plates at their contacting surfaces and the liquefaction and dispersion of the metal where the weld should have been owing to the presence of scale, rust, or foreign matter between the plates.

In accordance with this invention the difficulties heretofore met with are overcome by the use of an intermittent current automatically applied to the work. The initial application of current is sufficient only to heat and break up the surface slag on the plates, leaving the surfaces in contact in suitable condition to be cleared of all matter upon another application of current. The molten slag is subsequently removed by additional applications of current and the plates preheated for fusion, then given a further and final heating to effect the fusion of the plates and completion of the weld.

In the drawings, 10 represents a spot welding machine of an approved type having upper and lower electrodes 11 and 12 between which the work 13 may be introduced. Upper electrode 11 is relatively movable and is suspended from one end of a rocker arm 14 fulcrumed intermediate its ends at 15. The purpose of the rocker arm 14 is to apply welding pressure to the work 13 through the medium of upper electrode 11 as the arm is actuated by mechanism hereinafter described.

Journalled in bearing blocks 21 on the machine is a power shaft 20 carrying a power wheel 22 driven by motor 23, and a cam piece 24 in position to engage roller 16 journalled in rocker arm 14, and cause said arm to rock upon its fulcrum 15, to apply or remove electrode pressure as will hereinafter appear. Upon said shaft is also mounted a current interrupter disk 25 having spaced depressions 26, 26$^a$ and 26$^b$, and elevations 27 in its periphery for controlling and actuating a contact switch 28 to make and break the electric circuit for the intermittent application of the heating current to the work 13. The depressions and elevations in the disk periphery can be proportioned to give the desired number of interruptions of the current and shorter or longer periods of application or cessation of current, depending upon the grade, thickness, and condition of the stock to be welded.

Variations in the action of the interrupter disk 25 upon contact switch 28 may be made by means of an auxiliary control disk 30 mounted upon shaft 20 adjacent the interrupter disk 25 as shown in Fig. 2 of the drawings. The control disk is designed with its normal peripheral edge 31 cut away as shown at 32 in Fig. 4, the cut away portion 32 being coextensive with the aggregate length of the depressions 26, 26ª, and 26ᵇ, in the interrupter disk 25. By adjusting the auxiliary disk 30 with its normal peripheral edge 31 overlapping certain of the depressions in the interrupter disk 25, the lengths of periods during which the current should be on and off during the welding process may be varied to meet the requirements of the work.

The contact switch 28 is mounted in such relation to control disks 25 and 30 that the contact roller 33 of the switch will at all times bear upon the peripheries of the disks and rise and fall as the elevated and depressed portions of the disk contours are presented during the rotation of the disks. This movement of the roller 33 will rock the switch upon its pivot 34 against the tension of spring 36 to move crank arm 29 away from terminal post 35 to break the circuit and interrupt the flow of electric current to the electrodes until the roller 33 again enters a depression in the disks when crank arm 29 will move into contact with post 35 under the power of spring 36 to close the circuit for another current application.

In the practice of the invention, the welding operation is initiated by introducing the work 13 between the electrodes 11 and 12, the upper electrode being raised by means of the handle 17 to admit the work, and then lowered to hold it in position for welding as best shown in Fig. 1 of the drawings. In this figure, the rocker arm 14 is shown in its pressure applying position with the cam engaging roller 16 riding the major perimeter 18 of cam piece 24 with the cam piece rotating in the direction indicated by the arrow; at this stage of movement the rocker arm 14 further depresses electrode 11 to obtain the desired welding pressure upon the work 13 just prior to the closing of switch 28 and application of current. The relation of cam piece 24, contact switch 28, and control disks 25 and 30 is such that as the cam engaging roller 16 mounts the major perimeter 18 of the cam piece as shown in the drawing, the switch contact roller 33 is ready to enter depressions 26 and 32 of said disks to permit switch 28 to rock upon its pivot to move its crank arm 29 into circuit closing contact with terminal post 35, such position of switch roller being indicated in broken lines at 40 in Fig. 3.

Continued rotation of the disks will cause the switch contact roller 33 to drop into disk depression 26 to permit the contact switch 28 to be actuated by the spring 36 to close the circuit for the initial application of current to the work as indicated in Fig. 5 of the drawings. Further rotation of the disks will cause elevated portion 27 between depressions 26 and 26ª to engage contact roller 33 of the switch and lift it out of depression 26 to actuate switch 28 against the force of the spring 36 to interrupt the current for a length of time proportioned to the speed of rotation of the disk and length of said elevated portion 27 until roller 33 enters the next succeeding depression 26ª for the second application of current during which period the rust and scale on the contacting surfaces of the plates will be melted and the plates preheated. The second application continues preferably for a longer period than the first but for a shorter length of time than the third period of application of current which begins when contact roller 33 drops into depression 26ᵇ to disperse the melted scale and rust and cause a final heating and fusion of the plates and completion of the weld, whereupon the roller 33 is again lifted to interrupt the current until the next cycle of current application is reached.

During the series or cycle of current applications, the disks 25 and 30, and cam piece 24, will have rotated approximately half a revolution or about 180° from the position indicated in Fig. 1, in a clockwise direction, carrying the low perimeter 41 of cam piece 24 to the side of the shaft 20 opposite to that shown in this figure. Continued rotation of the cam piece will cause roller 16 in rocker arm 14 to engage the low perimeter 41 as the rocker arm moves downwardly under tension of spring 42; this movement of rocker arm 14 removes the welding pressure of the upper electrode 11 from the work 13, the electrode being subsequently raised by means of handle 17 to release or shift the work or introduce other work between the electrodes, the electrode being arranged for manipulation independently of rocker arm movement and adjustable to the thickness of the work.

With the automatic mechanism described, the number and lengths of periods during which the current should be on and off, and the welding pressure, having been determined in accordance with the grade, thickness, and condition of the stock to be welded, uniform welds can be formed with certainty, economy, and despatch.

The process may be performed by hand, and it is quite possible to achieve some measure of success with such welding, but owing to the difficulty of gauging the periods of current application and intervals of time between such applications, the welds produced and resultant product are not as satisfactory as those made with the automatic welder described because of the lack of uniformity characteristic of hand welding and the uncertainties incident to such operations.

The control disk mechanism may be applied to any standard spot-welding machine at small cost and without effecting the construction or operation of such machine other than that involved by the incorporation of the control disks, as above described. Although shown in the present embodiment as moving in a vertical plane it is conceivable that the disks 25 and 30 may be arranged for operation in a horizontal or inclined plane should that be found necessary or desirable.

What I claim is:—

1. In an electric welding machine of the class described, including an electric circuit and a switch movable to make and break said circuit, the combination with a circuit interrupter disk having a plurality of spaced depressions of progressively increasing lengths in its periphery successively engageable with said switch, of a complemental disk having a depression in its peripheral edge as great in extent as the aggregate of the depressions in said interrupter disk and intermittently engageable with said switch.

2. In an electric welding machine of the class described, the combination including a welding circuit, a switch movable to make and break the welding circuit, and means for automatically actuating said switch to supply current intermittent in its initial application and relatively continuous during the final stage of current application.

3. In a machine of the class described, the combination comprising a pair of work-holding electrodes, associated mechanism for actuating one of said electrodes for transmitting welding pressure to the work, and a two-stage control means operable during the period of electrode pressure to supply current intermittent in its initial application and relatively continuous during the final stage of current application.

4. In a machine of the class described, the combination comprising a pair of electrodes and associated mechanism for actuating one of said electrodes for transmitting welding pressure to the work, and a two-stage control means operable during the period of electrode pressure to automatically supply current intermittently during its initial application and continuously in the final stage of current application.

5. In an electric welding machine of the class described, the combination including an electric circuit and a switch movable to make and break said circuit, of a circuit interrupter disk having a plurality of spaced depressions of progressively increasing lengths in its periphery successively engageable by said switch, and a complemental disk having a depression in its peripheral edge as great in extent as the aggregate of the depressions in the interrupter disk, said last mentioned disk being adjustable to vary the lengths of certain of the depressions in said other disk.

6. In an electric welding machine of the class described, the combination including an electric circuit and a switch movable to make and break said circuit, of a circuit interrupter disk having a plurality of spaced depressions of progressively increasing lengths in its periphery successively engageable by said switch, and a complemental disk having a depression in its peripheral edge as great in extent as the aggregate of the depressions in the interrupter disk, said last mentioned disk being adjustable to vary the lengths of the first and last of the depressions in said other disk.

In witness whereof I have hereto set my hand this 20th day of February, 1929.

ERNEST LUNN.